United States Patent
Harrison

(10) Patent No.: US 11,251,618 B2
(45) Date of Patent: Feb. 15, 2022

(54) APPARATUS AND METHOD FOR REACTIVE POWER CONTROL

(71) Applicant: Enphase Energy, Inc., Petaluma, CA (US)

(72) Inventor: Michael J. Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 597 days.

(21) Appl. No.: 15/001,534

(22) Filed: Jan. 20, 2016

(65) Prior Publication Data
US 2016/0211743 A1 Jul. 21, 2016

Related U.S. Application Data

(60) Provisional application No. 62/105,886, filed on Jan. 21, 2015.

(51) Int. Cl.
*H02J 3/18* (2006.01)

(52) U.S. Cl.
CPC ............. *H02J 3/1835* (2013.01); *Y02E 40/30* (2013.01)

(58) Field of Classification Search
None
See application file for complete search history.

(56) References Cited

U.S. PATENT DOCUMENTS

| | | | |
|---|---|---|---|
| 4,529,925 A | 7/1985 | Tanaka et al. | |
| 8,410,635 B2* | 4/2013 | Ransom | B60L 58/15 307/82 |
| 9,735,581 B2* | 8/2017 | Pan | H02J 3/381 |
| 2002/0087234 A1 | 7/2002 | Lof et al. | |
| 2009/0167095 A1* | 7/2009 | Rivas | F03D 7/0284 307/87 |
| 2009/0323380 A1* | 12/2009 | Harrison | H02M 7/217 363/126 |
| 2011/0031930 A1* | 2/2011 | Kajouke | H02M 3/33584 320/128 |
| 2012/0205981 A1* | 8/2012 | Varma | H02J 9/00 307/64 |
| 2013/0049703 A1* | 2/2013 | Perisic | H02J 7/007 320/162 |
| 2014/0160800 A1* | 6/2014 | Zimmanck | H02M 3/3376 363/17 |

(Continued)

FOREIGN PATENT DOCUMENTS

| | | | | |
|---|---|---|---|---|
| JP | 2005348479 A | 12/2005 | | |
| WO | WO 2016118700 A1 * | 7/2016 | ............ | H02J 3/1835 |

OTHER PUBLICATIONS

Manias et al., "A Novel Sinewave in AC to DC Converter with High-Frequency Transformer Isolation", IEEE Transactions on Industrial Electronics, Nov. 4, 1985, vol. IE-32.

(Continued)

*Primary Examiner* — Lincoln D Donovan
*Assistant Examiner* — Khareem E Almo
(74) *Attorney, Agent, or Firm* — Moser Taboada

(57) ABSTRACT

Apparatus and method for controlling reactive power. In one embodiment, the apparatus comprises a bidirectional power converter comprising a switched mode cycloconverter for generating AC power having a desired amount of a reactive power component.

18 Claims, 9 Drawing Sheets

(56) References Cited

U.S. PATENT DOCUMENTS

2014/0183968 A1\* 7/2014 Harrison .................. H02J 5/00
                                                        307/104
2017/0110976 A1\* 4/2017 Frampton ................. H02P 9/48

OTHER PUBLICATIONS

Vlatkovic et al., "Analysis and Design of a Zero-voltage Switched, Three-phase PWM Rectifier with Power Factor Correction", Power Electronics Specialists Conference, 1992. PESC '92 Record, 23rd Annual IEEE, 1992, pp. 1352-1360, vol. 2.
Huisman, "A Multiphase Series-Resonant Converter with a New Topology and a Reduced Number of Thyristors", IEEE Transactions on Power Electronics, Jan. 1995, vol. 10.
TAKEUCHIt et al., "Isolated Three-phase AC-to-DC Bidirectional Converter with a Small Number of Switches", Power Conversion Conference—Nagaoka, Aug. 1997, pp. 479-482, vol. 1.
Pinheiro et al., "Zero Voltage Switching Series Resonant based DC-AC Converter", Electrical and Computer Engineering, 1998. IEEE Canadian Conference, May 1998, pp. 549-552, vol. 2.
Balakrishnan et al., "Capacitor-Less VAR Compensator Based on a Matrix Converter", North American Power Symposium (NAPS), 2010, Sep. 2010.
Krishnaswami et al., "Photovoltaic Microinverter using Single-stage Isolated High-frequency link Series Resonant Topology", 2011 IEEE Energy Conversion Congress and Exposition, Sep. 2011, pp. 495-500.
"Common Functions for Smart Inverters, Version 3" EPRI,http://integratedgrid.com/documents/common-functions-for-smart-inverters-version-2/, Feb. 2014.
International Search Report and Written Opinion dated Apr. 25, 2016 for PCT Application No. PCT/US2016/014235.

\* cited by examiner

APPARATUS AND METHOD FOR REACTIVE POWER CONTROL

CROSS-REFERENCE TO RELATED APPLICATIONS

This application claims benefit of U.S. provisional patent application Ser. No. 62/105,886, entitled "Power Converter Having Reactive Power Control" and filed Jan. 21, 2015, which is herein incorporated in its entirety by reference.

BACKGROUND OF THE INVENTION

Field of the Invention

Embodiments of the present invention generally relate to power conversion and, more popularly, to a power converter having reactive power control.

Description of the Related Art

Alternative power systems such as solar, wind, and the like generally produce DC power that is converted to AC power for injection onto the AC power grid. Conversion from DC power to AC power must be performed very efficiently to enable these alternative power systems to be commercially viable. One form of highly efficient power converter uses a cycloconverter. A cycloconverter converts a constant voltage, constant frequency AC waveform to another AC waveform of a lower frequency by synthesizing the output waveform from segments of the AC supply without an intermediate DC link. To facilitate DC to AC conversion, a DC full or half bridge circuit is coupled between a DC power source and the cycloconverter. The combination of the DC bridge and the cycloconverter provides a highly efficient DC to AC power converter (also referred to as an inverter). Cycloconverters are available in single phase and three-phase configurations. For purposes of this description, a switched mode cycloconverter switches a cycloconverter at a frequency that is higher than the frequency of the AC grid.

Switched mode three-phase cycloconverters were described in literature as early as 1985. Improvements that increased efficiency include enhanced control requirements to achieve zero volt switching (ZVS) operation and a simplification that reduced the number of switches used in the cycloconverter by adopting a half-bridge configuration. A further advance used a half-bridge cycloconverter that included a series-resonant circuit employing a variable frequency control, where a transformer center tap was used in conjunction with an LLC series-resonant circuit relying upon a gapped transformer core to facilitate efficient cycloconversion.

These advances in switched mode cycloconverter circuitry made available highly efficient power converters for use with alternative power systems. The widespread use of alternative power systems has raised concern with traditional power generation companies regarding reactive power control for the AC power grid.

Regulations and standards (e.g., IEC 1000-3-2) have been adopted to ensure that circuitry coupled to the power grid utilizes power factor correction techniques to ensure that the power factor at the connection to the power grid is unity. This regulation applies to power converters as well as power loads. For purposes of this description, power factor correction (PFC) is a technique used to provide harmonic correction of nonlinear loads that ensures that the power converter couples energy to the grid having the sinusoidal current in phase with the sinusoidal voltage of the AC grid. A power factor of unity is used even if the power factor of the power grid is not unity.

Power consumers coupled to the power grid can cause reactive power to be present on the power grid. As such, the grid power factor is no longer unity. In some instances the power generation companies require power consumers (e.g., large industrial power consumers) to perform reactive power control to reduce the amount of reactive power on the power grid, i.e., the large consumers are asked to absorb the reactive power. The power generation utility also compensates for reactive power on the grid in an attempt to maintain a power factor of unity.

Power converters used in alternative energy systems have not been designed to facilitate reactive power control; these power converters are designed for power factor control to ensure the energy that they are producing has a power factor of unity. As alternative energy systems become larger and larger, in some areas, the power they generate by alternative generator sources may dominate the power on the power grid without any reactive power control.

Therefore, there is a need in the art for power converters used in alternative energy systems to facilitate reactive power control.

SUMMARY OF THE INVENTION

Embodiments of the present invention generally relate to a method and apparatus for controlling reactive power substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which embodiments of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention include a power converter having reactive power control. More specifically, embodiments of the invention include a bidirectional power converter having the capability of flowing power into and out of a storage element within the power converter. The power converter comprises a DC-side bridge coupled via a resonant tank and transformer to a switch mode cycloconverter coupled to a controller. The controller is adapted to receive a power utility defined reactive power control schedule that is implemented by the power converter. As such, the bidirectional power converter may create reactive power at times and with a magnitude defined in this schedule.

Figure 1:
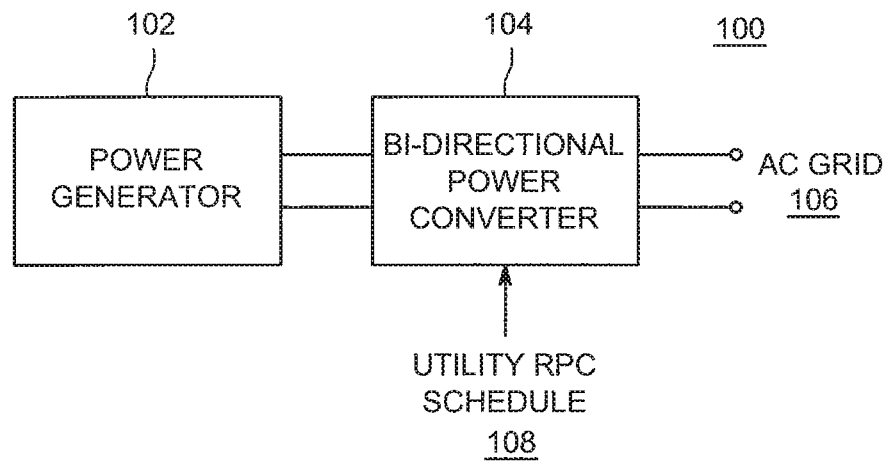
FIG. 1 is a block diagram of a power generation system in accordance with embodiments of the present invention.

FIG. 1 is a block diagram of a power generation system 100 in accordance with embodiments of the present invention. The power generation system 100 comprises a power generator 102 coupled to a bidirectional power converter 104. The power generator 102 (or power source) may be any form of DC power generator including, but not limited to, a wind turbine, solar panel or panels, a battery or batteries, and the like. Power generator 102 provides DC power to the bidirectional power converter 104. The bidirectional power converter 104 produces AC power that is coupled to an AC grid 106. To facilitate reactive power control (RPC), a power utility RPC schedule is provided to the bidirectional power converter 104. The utility RPC schedule, in one simple form, may comprise a list of reactive power amounts and the time of day at which the reactive power is to be supplied to the AC grid 106. Typically, the local power generation company or utility that manages the AC grid 106 provides the RPC schedule. However, in other embodiments, an RPC schedule may contain a schedule of reactive power as a function of: AC grid voltage (Mains Voltage), inverter output power, change in AC grid voltage, fixed value, and the like. See *Common Functions for Smart Inverters*, Version 3, EPRI, Palo Alto, Calif.:2013. 3002002233.

Figure 2:
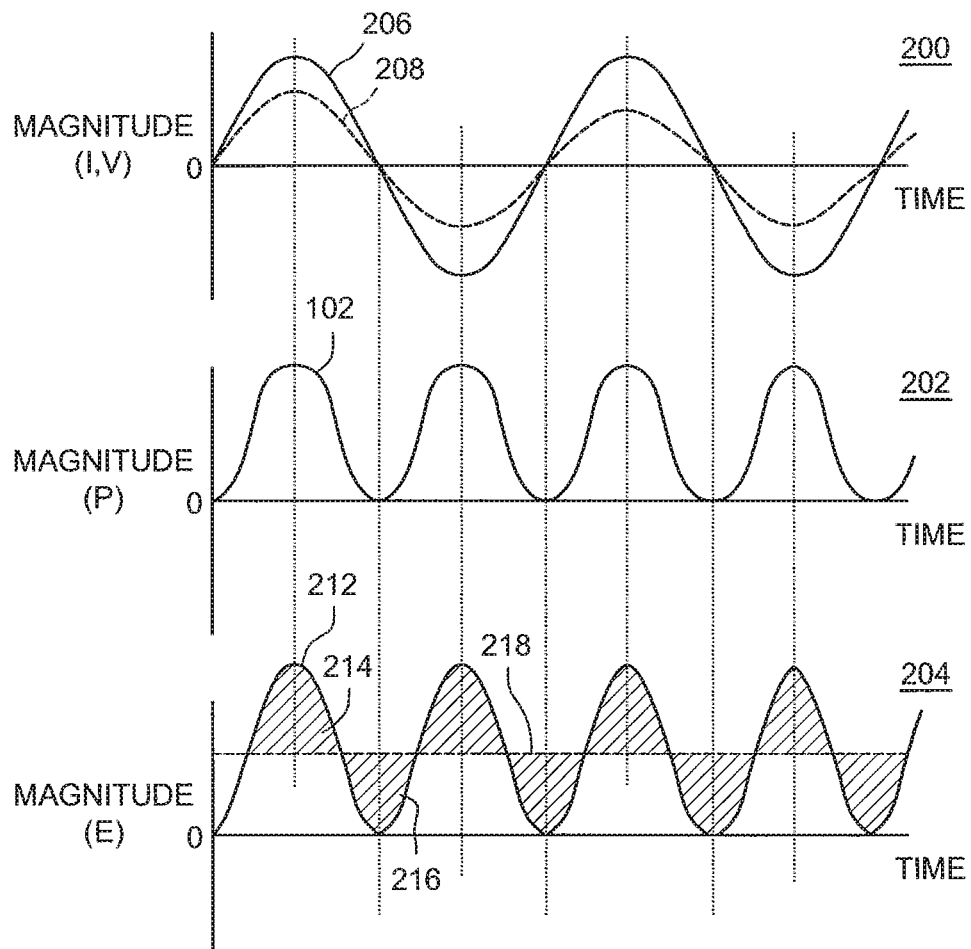
FIG. 2 is a set of graphs representing magnitude versus time of: voltage/current of a single phase of the AC power being created by a power converter without any reactive power control (i.e., power factor of unity), a power representation of the voltage/current, and energy flow within a power converter having no reactive power control.

FIG. 2 is a set of graphs 200, 202, 204 respectively representing magnitude versus time of: voltage/current of a single phase of AC power being created by a power converter without any reactive power (i.e., power factor of unity), a power representation of the voltage/current, and energy flow within a power converter having no reactive power control. More specifically, graph 200 depicts the magnitude of both voltage 206 and current 208 created by a power converter having no reactive power control, where the AC power has a power factor of unity (no reactive power). Note that the voltage 206 and the current 208 are phase synchronized. Typically, output of the power converter is synchronized to the voltage of the AC grid to which the power converter is supplying the power. With power factor of unity, the power graph 202 depicts the power fluctuating between 0 and a positive magnitude at a frequency that is twice the frequency of the AC grid voltage.

Because the input from the power generator 102 is a constant DC power and the output power from the bidirectional power converter 104 is a pulsatile AC power during DC to AC conversion, the bidirectional power converter 104 must buffer the input power to create the oscillating AC output power. Typically, this energy buffering is accomplished using a storage device such as a capacitor within the bidirectional power converter. Graph 204 depicts the energy flow into and out of the power converter's storage device (line 212) to provide the necessary energy buffering. The average power delivered by the DC source 102 is represented by dashed line 218. The energy 214 above the average power line 218 represents energy being released from the storage device and the energy 216 below the average power line 218 represents energy being stored in the storage device. When no reactive power is needed, the energy storage and release is synchronized at twice the frequency of the voltage of the AC grid, i.e., synchronous with the power of the AC grid.

Figure 3:
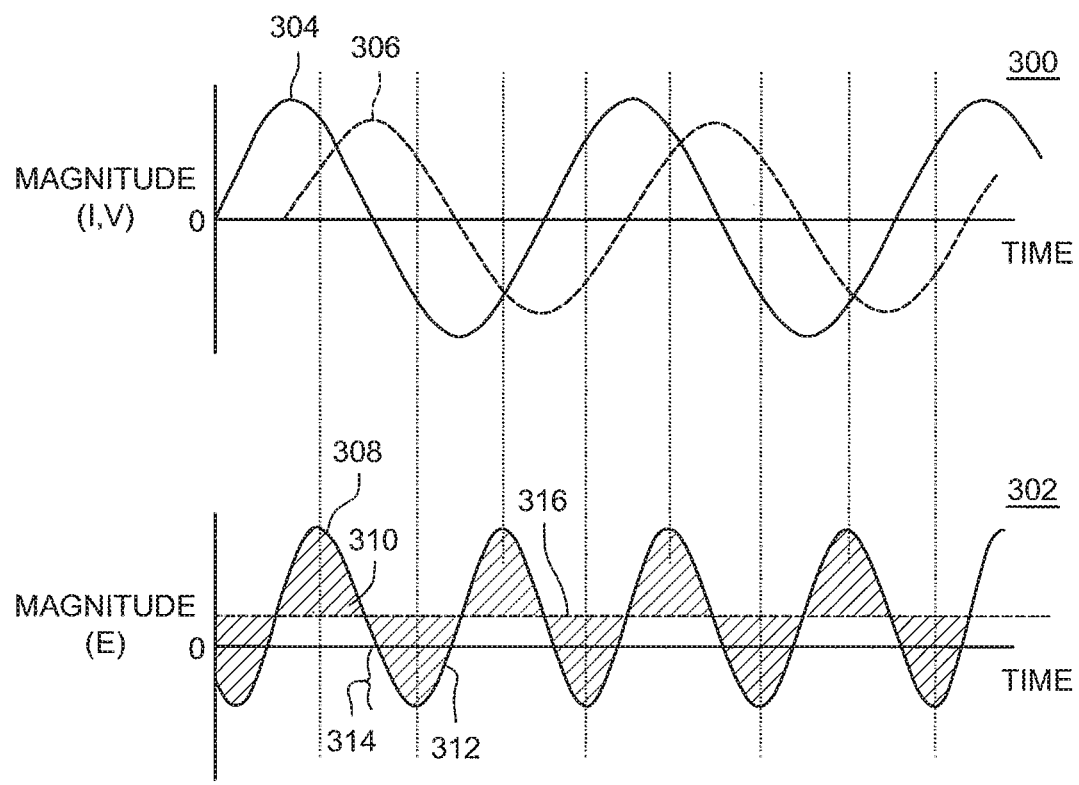
FIG. 3 is a set of graphs representing magnitude versus time of: voltage/current of a single phase of the AC power being created by the power converter having reactive power control (i.e., power factor that is not unity); and energy flow within a power converter being used to create reactive power.

FIG. 3 is a set of graphs 300, 302 respectively representing magnitude versus time of: voltage/current of a single phase of the AC power being created by the power converter 104 when employing reactive power control (i.e., power factor that is not unity); and energy flow within the power converter 104 being used to create reactive power. More specifically, the graph 300 depicts the magnitude of both voltage 304 and current 306 created by the power converter 104 when employing reactive power control. Note that the voltage 304 and the current 306 are not phase synchronized. The phase offset represents the amount of reactive power being created by the power converter 104. Reactive power is 90° out of phase with the AC grid voltage and the reactance may be lagging or leading. The ability to create reactive power requires a bidirectional power converter because power must be able to flow to the AC grid 106 as well as from the AC grid 106.

The graph 302 depicts the energy flow (i.e., line 308) into and out of the storage device within the bidirectional power converter 104. Note that a portion of the curve at 314 is below zero magnitude level indicating that energy must flow from the grid 106 during this period. For magnitudes above zero, energy is flowing into the grid 106. As such, the production of reactive power is only possible with a bidirectional power converter.

Figure 4:
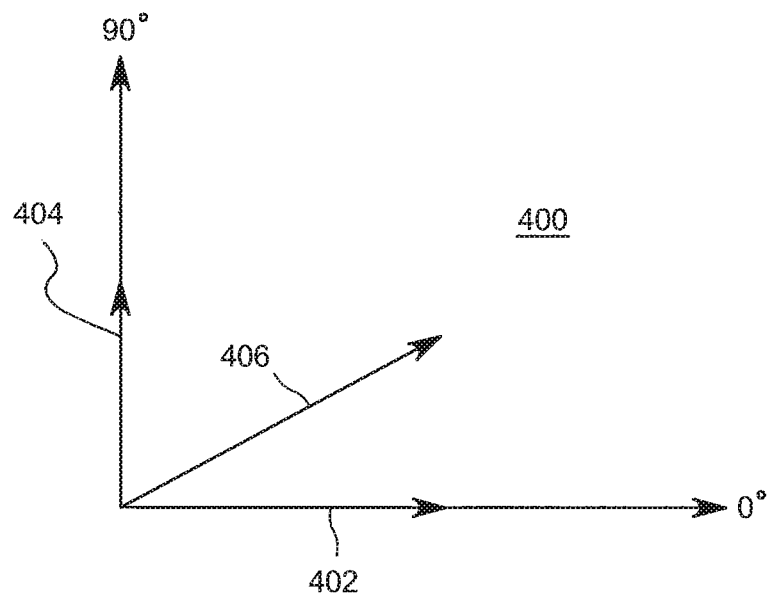
FIG. 4 is a phasor representation of AC power.

FIG. 4 is a phasor representation 400 of AC power. Phasor 402 represents real power of which the current is in phase with the AC grid voltage. Phasor 404 represents imaginary power (units of VAr—Volt-Amps reactive) of which the current is quadrature to the AC grid voltage. Phasor 406 represents the vector addition that results if the real and imaginary power vectors 402 and 404 are combined to obtain a reactive resultant phasor 406. This reactive phasor 406 represents the reactive power being generated and this will be specified in units of VA (Volt-Amps). The units VA are used for reactive loads and the way of calculating VA is to simply multiply the magnitude of the voltage by the magnitude of the current in amps—ignoring the fact that voltage and current are not in phase. The reactive load (in units of VA) has two components—a real power component (in units of W) and an imaginary power component (in units of VAr). This relationship can be expressed as a vector identity: VA=W+VAr (where all three entities represent vector components). The imaginary power component is also referred to herein as a reactive power component.

Figure 5:
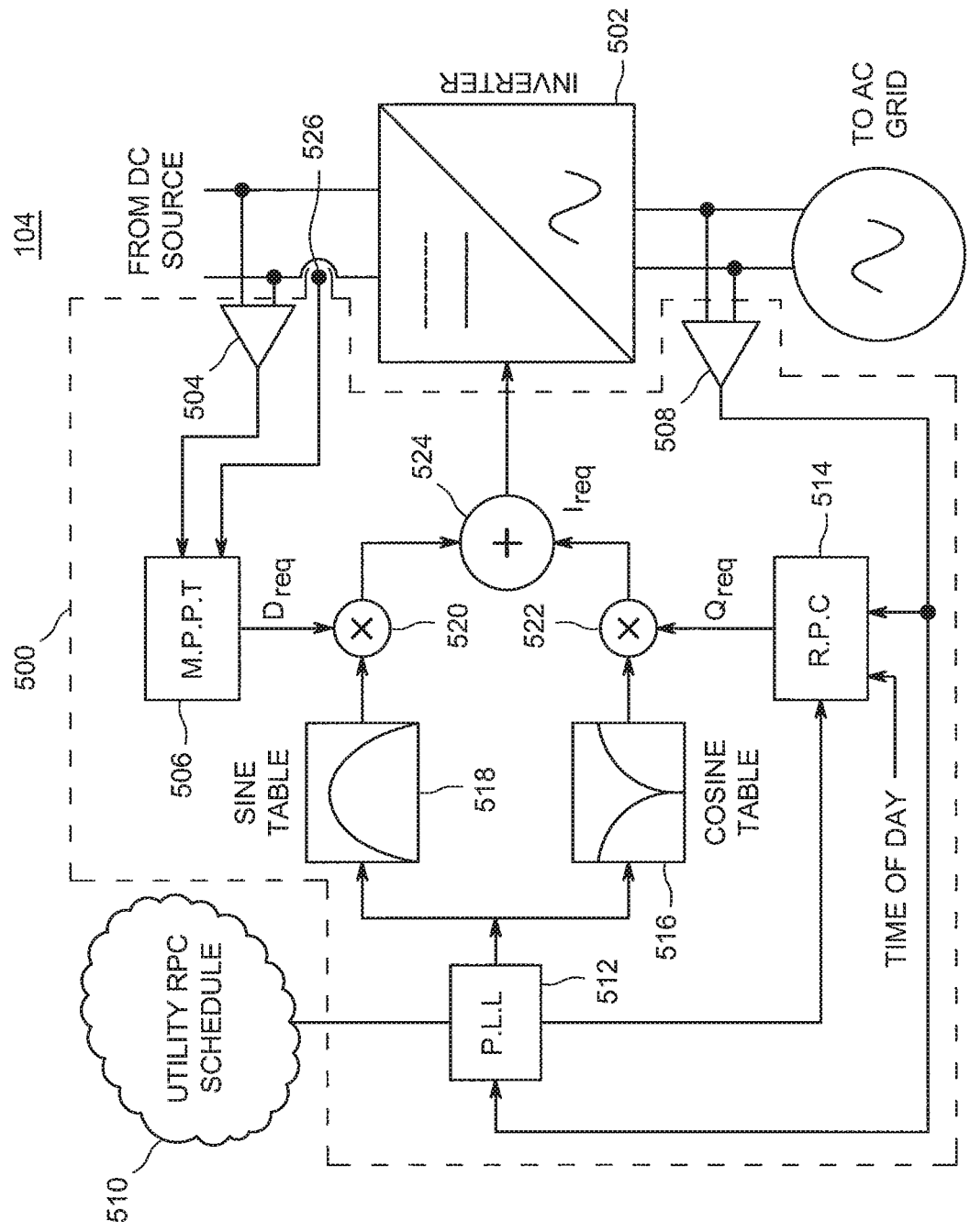
FIG. 5 is a block diagram of a bidirectional power converter in accordance with an embodiment of the present invention.

FIG. 5 is a block diagram of a bidirectional power converter 104 in accordance with an embodiment of the present invention that is capable of creating reactive power. The bidirectional power converter 104 comprises a controller 500 and an inverter 502. Embodiments of the inverter 502 are described in detail with respect to FIGS. 7 and 8 below. The controller 500 comprises a first sampler 504, a second sampler 508, a current sampler 526, a maximum power point tracking (MPPT) controller 506, a phase lock loop (PLL) 512, a cosine table 516, a sine table 518, a first multiplier 520, a second multiplier 522, a reactive power controller (RPC) 514 and a summer 524. In some other embodiments, one or more of the first sampler 504, the second sampler 508, and the current sampler 526 may be components external to the controller 500.

The power controller 500 receives as input: DC power of the DC source (e.g., the first sampler 504 samples values of DC voltage and DC current), AC voltage sample of the AC grid voltage (e.g., the second sampler 508 samples values of the AC voltage), a utility RPC schedule 510, and the time of day (e.g., from a "real time clock" function residing within the controller 500). In one embodiment, the time of day is used in conjunction with the utility RPC schedule 510 to define the time during the day when particular values of reactive power need to be created and applied to the AC grid. In other embodiments, the RPC schedule 510 may contain a schedule of reactive power as a function of: AC grid voltage (mains voltage), inverter output power, change in AC grid voltage, fixed value, and the like.

In operation, the second sampler 508 creates a digital signal representative of an instantaneous voltage of the AC grid voltage. The digital representation is coupled to the PLL 512 as well as the RPC 514. The PLL 512 generates a phase counter signal that indexes two look up tables 516 and 518—the table that is in phase with the AC grid voltage is referred to as the sine table 518 and the table that is quadrature to the AC grid voltage is referred to as the cosine table 516 (other conventions could be used). The outputs from the sine and cosine tables 518 and 516 represent normalized (by definition to unity—i.e., max value for sine=1) representations of the AC grid voltage (for sine) and the quadrature of the AC grid voltage (for cosine).

The MPPT controller 506 generates a signal Dreq and couples the generated Dreq signal to the first multiplier 520, while the RPC 514 generates a signal Qreq and couples the generated Qreq signal to the second multiplier 522. The two signals Dreq and Qreq represent the requested real and imaginary currents, respectively, that are to be delivered to the AC grid. Dreq is the direct current request—i.e., the real current component and is supplied from the MPPT controller 506. In order to determine the signal Dreq, the MPPT controller 506 receives a representation of the DC source voltage from the sampler 504 and receives a representation of the current from the DC source from a current sampler 526 coupled between the DC source 102 and the MPPT controller 506. The MPPT controller 506 operates in a well-known manner known to those skilled in the art to derive a value Dreq for the desired real output current, while maintaining the DC source 102 operating at a maximum power point. The signal Qreq is the quadrature current request—i.e., the imaginary current request and is supplied from an algorithm that is, for example, ultimately specified by the power utility company. Typically, this algorithm, performed by the reactive power controller 514, would adjust the requested imaginary current as a function of the AC grid voltage as this will help regulate the voltage on the AC grid.

The signals Dreq and Qreq scale the outputs from the sine and cosine tables 518 and 516 respectively using a multiplication operation (x)—i.e., multipliers 520 and 522 respectively. The results of these two multiplications are summed together with an addition operation (+) (summer 524) and the output becomes the Ireq signal, where Ireq is a vector representation of the desired current to be supplied to the AC grid. Ireq has a polarity that mirrors the polarity of the AC current flowing out of the power converter 104. When the instantaneous AC voltage and current are of the same polarity, the condition is referred to as forward power flow and, when the instantaneous AC voltage and current are of opposite polarity, the condition is referred to as reverse power flow. There are different conventions for assigning polarity to the AC voltage, AC current, and power flow direction and defining polarity differently will result in a different but equally valid alternate convention.

Figure 6:
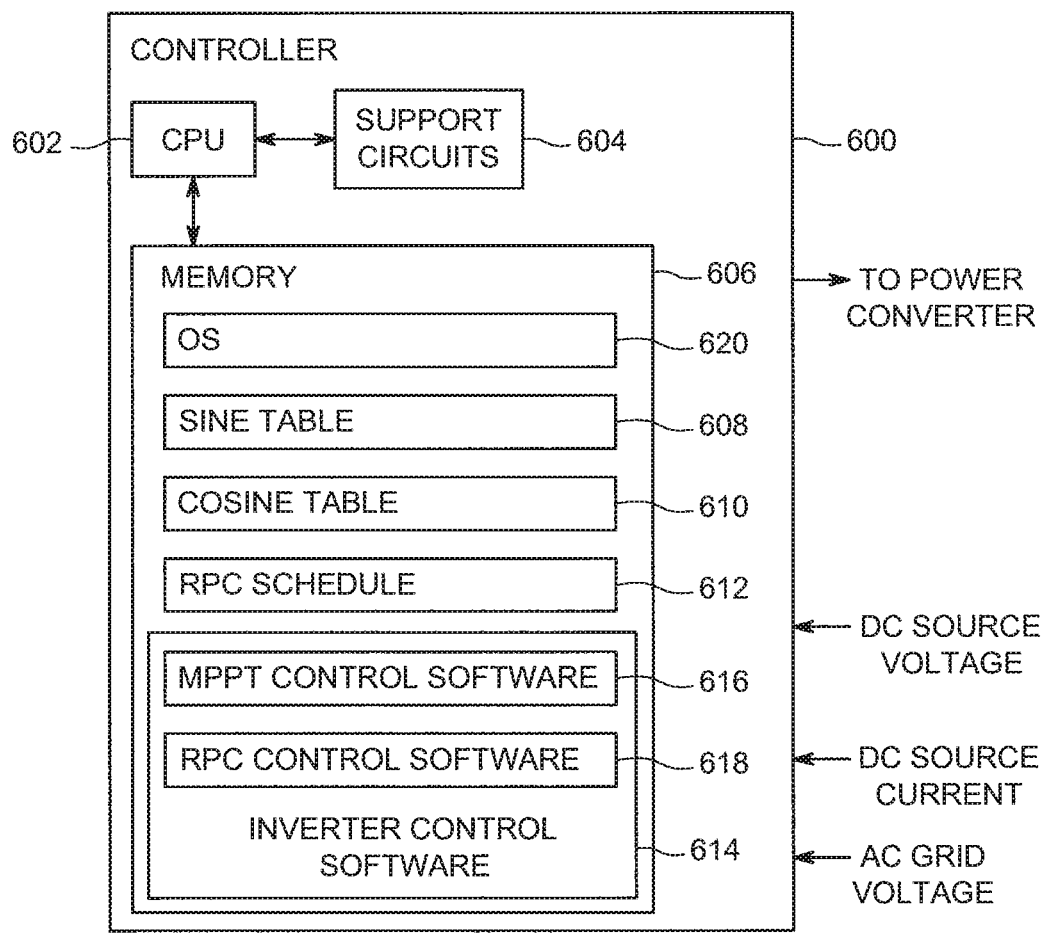
FIG. 6 is block diagram of a controller for the bidirectional power converter of FIG. 5.

FIG. 6 is a block diagram of one embodiment of a controller 600 for the embodiment of a bidirectional power converter of FIG. 5 (the controller 600 is one embodiment of the controller 500). The control functions defined above with respect FIG. 5 can be implemented in hardware, software, or a combination of hardware and software. Inputs to the controller 600 include a digital representation of the DC source voltage, a digital representation of the DC source current and a digital representation of the AC grid voltage. These signals are created using hardware to sample and digitize the voltages and current, e.g., an analog to digital (A/D) converter (not shown), (although in other embodiments the controller 600 may comprise one or more modules or components for sampling DC voltage, DC current, and/or AC voltage and generating digital representations thereof).

The controller 600 comprises a central processing unit (CPU) 602 coupled to each of support circuits 604 and memory 606; in some embodiments, the CPU 602 may further be coupled to a transceiver for communication to and from the power converter 102 (e.g., using power line communications). The CPU 602 may be any commercially available processor, microprocessor or microcontroller, or combinations thereof, configured to execute non-transient software instructions to perform various tasks such as those described herein. In some embodiments, the CPU 602 may be a microcontroller comprising internal memory for storing controller firmware that, when executed, provides the controller functionality. The controller 600 may be implemented using a general purpose computer that, when executing particular software, becomes a specific purpose computer for performing various embodiments of the present invention.

The support circuit 604 may include, but are not limited to, such circuits as power supplies, cache memory, clock circuits, and the like. The memory 606 may include readonly memory and/or random access memory that stores data and software instructions to be utilized by the CPU 602.

The memory 606 stores an operating system (OS) 620 (when needed) of the controller 600, where the OS 620 may be one of a number of commercially available operating systems such as, but not limited to, Linux, Real-Time Operating System (RTOS), and the like. The memory 606 stores non-transient processor-executable instructions and/or data that may be executed by and/or used by the CPU 602. These processor-executable instructions may comprise firmware, software, and the like, or some combination thereof. In the embodiment described with respect to FIG. 6, the memory 606 comprises a sine table 608, a cosine table 610, an RPC schedule 612, and inverter control software 614. The inverter control software includes MPPT control software 616 and RPC control software 618. When executed by the CPU 602, the MPPT control software 616 functions as the MPPT controller 506 and the RPC control software 618 functions as the RPC controller 514. The controller 600 may also be implemented as an application specific integrated circuit (ASIC) that is specifically programmed to perform the operations described herein (e.g., with respect to FIG. 5).

Figure 7:
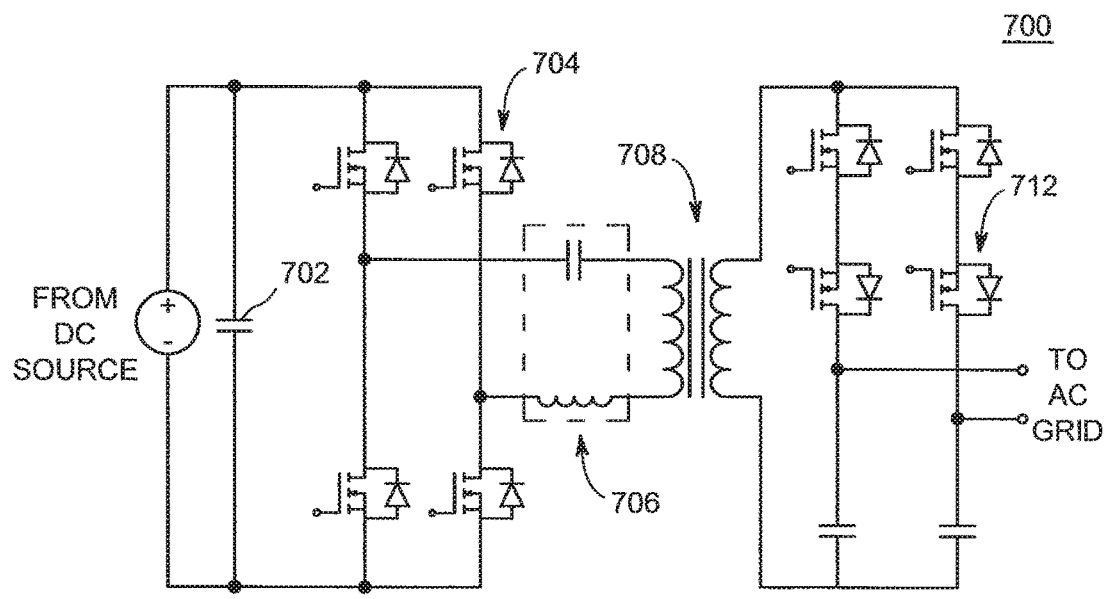
FIG. 7 is a schematic diagram of one embodiment of a single phase, inverter that can be used within the bidirectional power converter of FIG. 5.

FIG. 7 is a schematic diagram of one embodiment of a single phase inverter 700 that can be used within the bidirectional power converter 104 of FIG. 5 (i.e., the inverter 700 is one embodiment of the inverter 502). The inverter 700 comprises a storage device 702 (e.g., a capacitor), a DC full bridge 704, a resonant circuit 706, and isolation transformer 708, and a switched mode cycloconverter 712. As described above, the storage device 702, coupled across the input to the inverter 700, stores energy to facilitate both creation of AC power from DC power as well as facilitating creating reactive power. The bridge 704 converts DC power into a high-frequency AC signal. The DC bridge 704 is coupled to the resonant circuit 706 that has a resonance that is commensurate with the high-frequency AC signal.

The AC signal is coupled to the cycloconverter 712 via the isolation transformer 708. The cycloconverter 712 converts the high-frequency AC signal into a signal having a power profile commensurate with the AC power on the AC grid. The controller 500 of FIG. 5 or the controller 600 of FIG. 6 is used to control the timing of the switches within the bridge 704 and the cycloconverter 712 to achieve single-phase AC power containing reactive power.

To reiterate, the storage device 702 operates to buffer energy during the power conversion process. In addition, when the bidirectional power converter 104 must flow power from the grid 106 to facilitate reactive power generation, the storage device 702 stores the necessary energy.

Generally, a cycloconverter converts an AC signal of a particular voltage/current, frequency, and phase order directly to a different voltage/current and/or frequency and/or phase order without the use of an intermediate DC bus or DC energy storage. Although a single-phase cycloconverter is depicted in FIG. 7, a cycloconverter can have a single-phase, three-phase, or any general polyphase input. Likewise, a cycloconverter can have a single-phase, three-phase or any general polyphase output. Accordingly, cycloconverters can be used to convert from a polyphase system of any order (n=1, 2, 3, 4 . . . ) to any other polyphase system order (n=1, 2, 3, 4 . . . ). Cycloconverters rely on bidirectional switches. These switches are sometimes referred to as four-quadrant switches as they can handle voltage and current of any polarity (i.e., the four quadrants (++, +−, −+, −−). Four-quadrant or bidirectional switches can be made by connecting two unidirectional switches in series such that the two switches are orientated such that they conduct the same current in opposite directions. Alternatively, bidirectional switches can be facilitated using a bridge rectifier and a single unidirectional switch.

Figure 8:
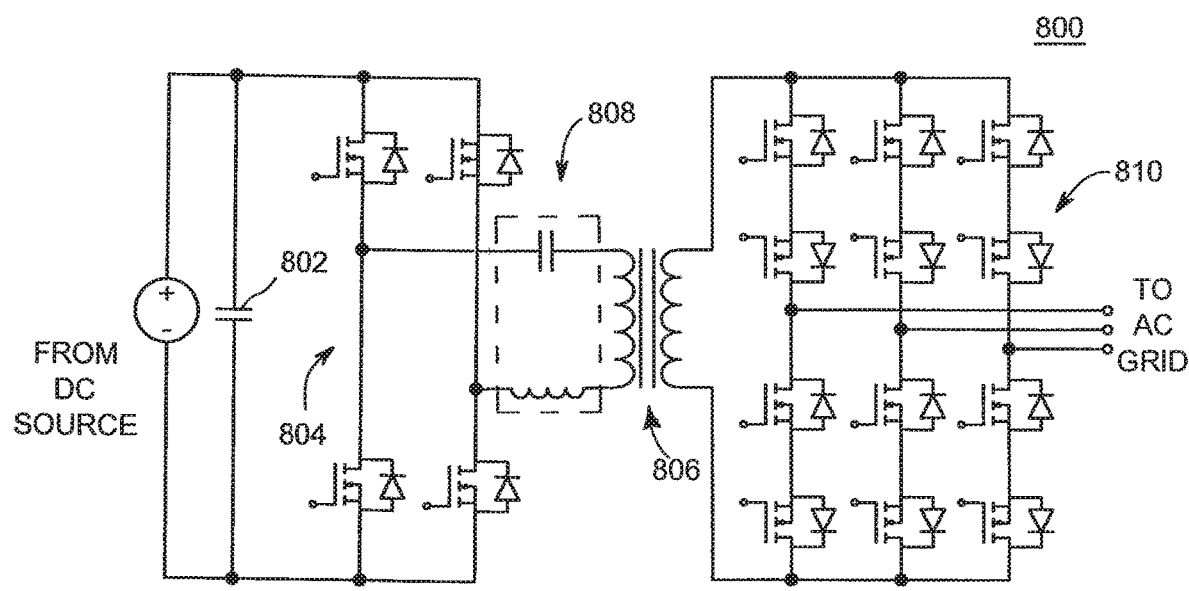
FIG. 8 is a schematic diagram of one embodiment of a three-phase inverter that can be used within the bidirectional power converter of FIG. 5.

FIG. 8 is a schematic diagram of an embodiment of a three-phase inverter 800 that can be used within the bidirectional power converter 104 of FIG. 5 (i.e., the inverter 800 is one embodiment of the inverter 502). The inverter 800 comprises a storage device 802 (e.g., a capacitor), a DC full bridge 804, a resonant circuit 808, an isolation transformer 806, and a switched mode cycloconverter 810. As described above, the storage device 802 stores energy to facilitate both creation of AC power from DC power as well as facilitating creating reactive power. The DC bridge 804 converts DC power into a high-frequency AC signal. The DC bridge 804 is coupled to the isolation transformer 806 via a resonant circuit 808 that has a resonance that is commensurate with the high-frequency AC signal. The AC signal is coupled to the cycloconverter 810. The cycloconverter 810 converts the high-frequency AC signal into a signal having a power profile commensurate with the three-phase AC power on the AC grid. The controller 500 of FIG. 5 or the controller 600 of FIG. 6 is used to control the timing of the switches within the bridge 804 and the cycloconverter 810 to achieve three-phase AC power containing reactive power.

Further information can be found on cycloconverter operation in commonly assigned US application publication number 2012/0170341, published on Jul. 5, 2012 having a title of "Method and Apparatus for Resonant Power Conversion" and herein incorporated by reference in its entirety.

Figure 9:
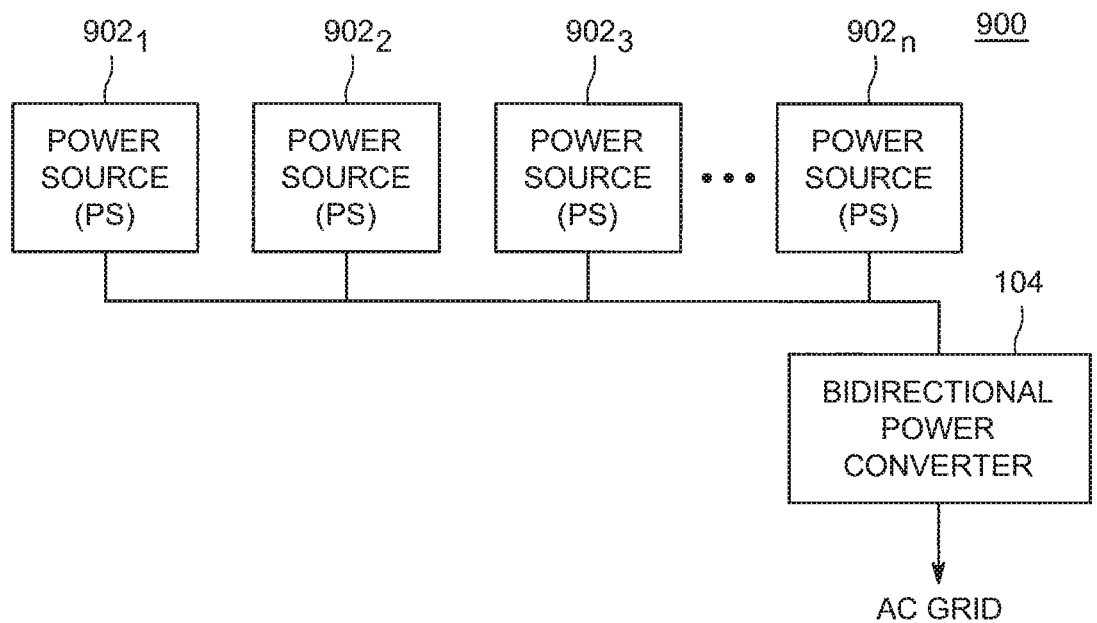
FIG. 9 is a block diagram of an alternative power system utilizing the bidirectional power converter of the present invention.

FIG. 9 is a block diagram of one embodiment of an alternative power system 900 utilizing the bidirectional power converter 104 of the present invention to produce AC power from DC power, where the AC power includes reactive power. The system 900 comprises a plurality of power sources (PS) $902_1$, $902_2$ . . . $902_n$, collectively referred to as power sources 902, coupled to the bidirectional power converter 104. The string of power sources 902 combines to provide DC power to the bidirectional power converter 104 for conversion to AC power having reactive power as described herein. The power sources 902 may be arranged in a large array coupled to a single bidirectional power converter 104 (as depicted in FIG. 9) or alternatively to a small number of bidirectional power converters 104.

Figure 10:
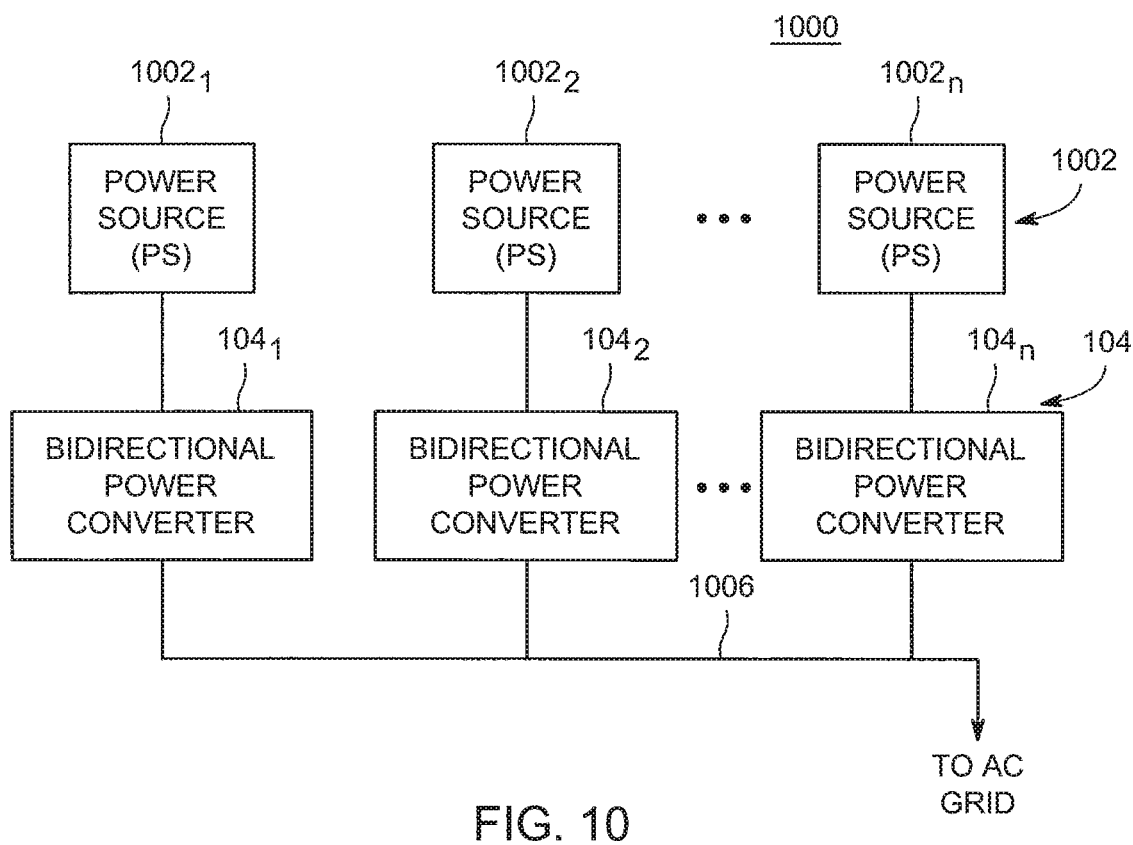
FIG. 10 is a block diagram of a second type of alternative power system utilizing the bidirectional power converter of the present invention.

FIG. 10 is a block diagram of one embodiment of a second type of alternative power system 1000 utilizing the bidirectional power converter 104 of the present invention to create AC power with reactive power. The system 1000 comprises a plurality of power sources (PS) $1002_1$, $1002_2$ . . . $1002_n$, collectively referred to as power sources 1002, each coupled to an associated bidirectional power converter $104_1$, $104_2$ . . . $104_n$, collectively referred to as power converters 104. Each power source 1002 provides its DC power output to a corresponding bidirectional power converter 104 for conversion to AC power having reactive power as described herein. The output AC power from the power converters 104 is coupled to a bus 1006. The power sources 1002 and their associated bidirectional power converters 104 may be arranged in a large array. The AC output power is coupled to the AC power grid 106.

Figure 11:
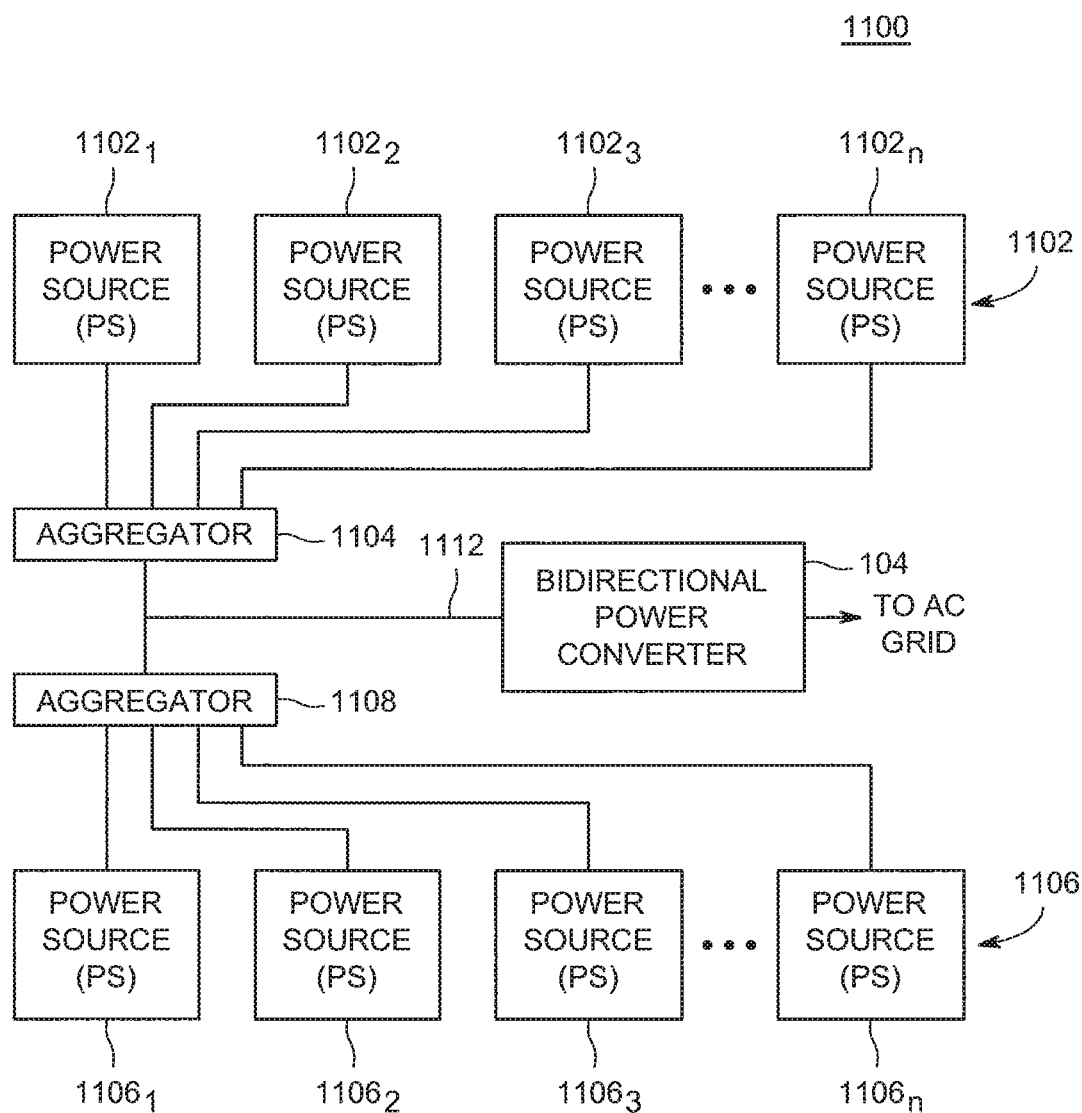
FIG. 11 is a block diagram of a third type of alternative power system utilizing the bidirectional power converter of the present invention.

FIG. 11 is a block diagram of one embodiment of a third type of alternative power system 1100 utilizing the bidirectional power converter 104 of the present invention to produce AC power with reactive power. The system 1100 comprises a plurality of power sources (PS) $1102_1$, $1102_2$ . . . $1102_n$, collectively referred to as power sources 1102, coupled to a DC power aggregator 1104 such that the DC power from the power sources 1102 is combined in the aggregator 1104 to a high-voltage DC power. A multitude of DC power sources (such as power sources $1106_1$, $1106_2$ . . . $1106_n$, collectively referred to as power sources 1106) and additional aggregators (such as the aggregator 1108 coupled to the power sources 1106) can be used to form a large power array. The outputs of the aggregators 1104 and 1108 are coupled to a high-voltage DC bus 1112 that is coupled to a bidirectional power converter 104. The strings of power sources 1102 and 1106 and the aggregators 1104 and 1108 combine to provide DC power to the bidirectional power converter 104 for conversion to AC power having reactive power as described herein.

FIGS. 9, 10 and 11 are intended to show a sample of the types of alternative power system arrangements in which the bidirectional power converter 104 may find use. The three systems 900, 1000, and 1100 are not meant to be exhaustive. The bidirectional power converter 104 having reactive power control may find use in any power system where, for example, a utility desires to control the reactive power on the AC grid 106. The utility RPC schedule 108 may be coupled to the bidirectional power converter 104 via wired and/or wireless communication techniques, such as Ethernet, wireless techniques based on standards such as IEEE 802.11, Zigbee, Z-wave, or the like, power line communications, and the like. In some embodiments, the utility RPC schedule 108 may be manually entered or pre-programmed into the bidirectional power converter 104.

Figure 12:
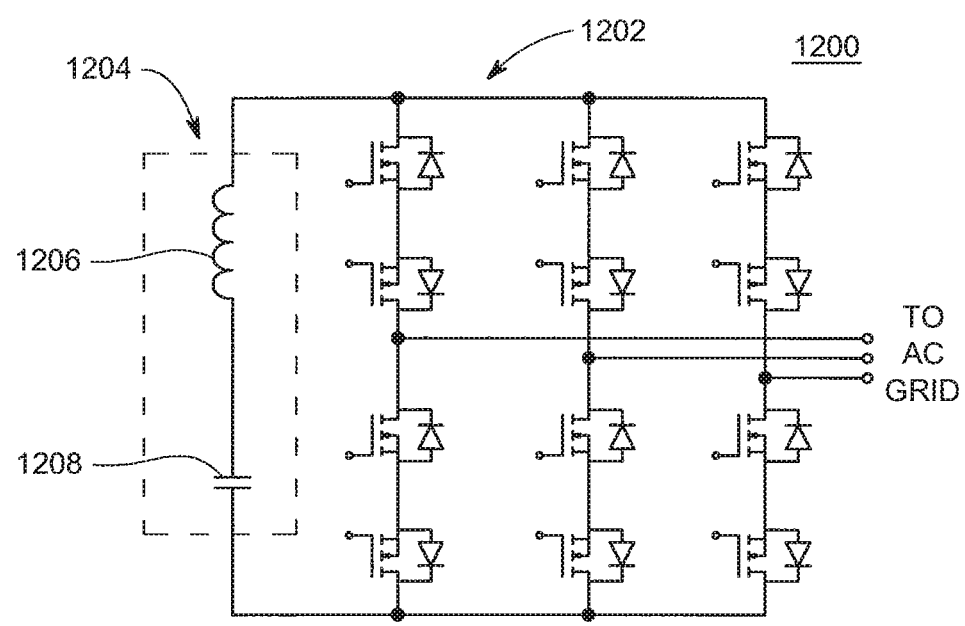
FIG. 12 is a schematic diagram of one embodiment of a three-phase VAr compensator that uses a switched mode cycloconverter.

FIG. 12 is a schematic diagram of an embodiment of a three-phase static VAr compensator 1200 that uses a switched mode cycloconverter 1200. The static VAr compensator 1200 comprises a storage device 1204 (e.g., a resonant tank comprising a capacitor 1206 and an inductor 1208) and the switched mode cycloconverter 1202. A static VAr compensator is one type of bidirectional power converter, and the static VAr compensator 1200 may be used as part of the bidirectional power converter 104 in one or more embodiments.

The storage device 1204 stores and releases energy to facilitate creating reactive power. The cycloconverter 1202 couples energy to and from the AC grid 106 such that the AC current is quadrature to the AC mains voltage, with a magnitude that is commensurate with the desired amount of reactive power. The controller 500 of FIG. 5 or the controller 600 of FIG. 6 may be used as the VAr compensator controller to control the timing of the switches within the cycloconverter 1202 to achieve three-phase AC power containing reactive power. Since the VAr compensator 1200 is not coupled to a DC source, there is no need for the controller to create the variable Dreq that is generated by the MPPT controller 506. As such, the VAr compensator controller does not include or has deactivated the MPPT controller 516/MPPT control software 616 and the associated sine table 518/sine table 608. In the VAr compensator 1200, the signal Dreq is unnecessary because the static VAr compensator 1200 is only capable of providing or consuming VAr, i.e., no real power is generated or consumed and there is only a reactive power component to the AC power.

Figure 13:
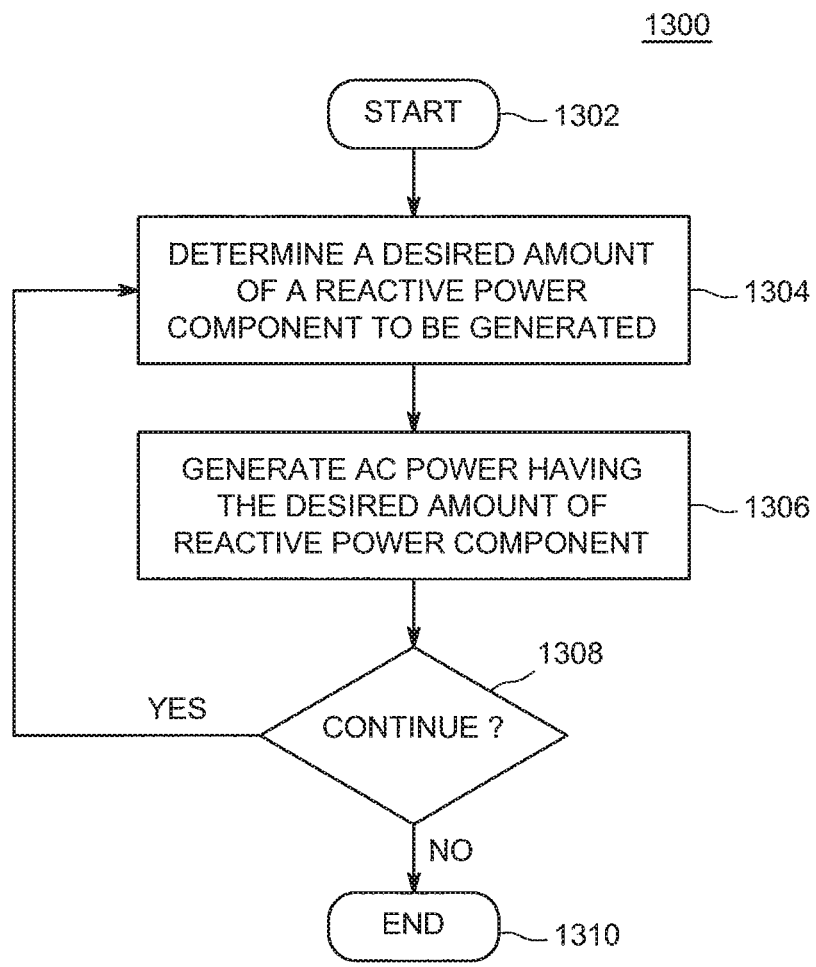
FIG. 13 is a flow diagram of a method for controlling reactive power in accordance with one or more embodiments of the present invention.

FIG. 13 is a flow diagram of a method 1300 for controlling reactive power in accordance with one or more embodiments of the present invention. The method 1300 is implemented using a bidirectional power converter having a switched mode cycloconverter (e.g., the bidirectional power converter 104). The bidirectional power converter is coupled to an AC line or grid, such as a commercial AC grid. In some embodiments of the method 1300, the bidirectional power converter is coupled to a renewable energy source (such as one or more photovoltaic (PV) modules) for receiving DC power that is converted to AC power. In one or more alternative embodiments, the bidirectional power converter is a static VAr compensator.

The method 1300 starts at step 1302 and proceeds to step 1304. At step 1304, a desired amount of a reactive power component to be generated by the bidirectional power converter is determined. In some embodiments, the desired amount of the reactive power component may be determined based on a reactive power control (RPC) schedule. The RPC schedule may be communicated to the birdirectional power converter using wired (e.g., power line communications) and/or wireless communication techniques. In certain alternative embodiments, the RPC schedule may be manually entered into the bidirectional power converter (e.g., through a web browser interface); in other alternative embodiments, the RPC schedule may be preprogrammed into the bidirectional power converter.

In order to facilitate reactive power control, the RPC schedule may comprise a list of reactive power amounts and the time of day at which the listed reactive power amounts are to be supplied to the AC grid. Additionally or alternatively, the RPC schedule may contain a schedule of reactive power to be generated as a function of one or more of the AC grid voltage, the power converter output power, a change in AC grid voltage, a fixed value, and the like.

Typically, the RPC schedule is provided by the local power generation company or utility that manages the AC grid to which the bidirectional power converter is coupled, although in some alternative embodiments the RPC schedule may be obtained from a different source.

The method 1300 proceeds from step 1304 to step 1306. At step 1306 the bidirectional power converter generates AC power having the desired amount of the reactive power component determined in step 1304. The bidirectional power converter generates the AC power using its switched mode cycloconverter as described above (e.g., with respect to FIG. 5). In some embodiments, the bidirectional power converter generates single-phase AC power; in other embodiments, the bidirectional power converter generates three-phase AC power.

The method 1300 proceeds to step 1308, where a determination is made whether to continue. If the result of the determination is yes, the method 1300 returns to step 1304; if the result of the determination is no, the method 1300 proceeds to step 1310 where it ends.

While the foregoing is directed to embodiments of the present invention, other and further embodiments of the invention may be devised without departing from the basic scope thereof, and the scope thereof is determined by the claims that follow.

The invention claimed is:

1. Apparatus for controlling reactive power comprising:
a bidirectional power converter comprising a switched mode cycloconverter operable in an AC to DC mode for generating reactive power stored in a storage device of the bidirectional power converter and operable in a DC to AC mode for creating AC power from DC power, receiving a high-frequency AC signal created by the storage device, and generating AC power having a desired amount of a reactive power component, wherein the bidirectional power converter is a resonant converter and generates the desired amount of the reactive power component as determined by a reactive power control schedule.

2. The apparatus of claim 1, wherein the reactive power control schedule comprises a list of reactive power amounts and a corresponding time of day for generating each reactive power amount of the list of reactive power amounts.

3. The apparatus of claim 1, wherein the reactive power control schedule comprises a schedule of reactive power to be generated as a function of one or more of AC grid voltage, bidirectional power converter output power, change in AC grid voltage, or a fixed value.

4. The apparatus of claim 1, wherein the bidirectional power converter is a static VAr compensator.

5. The apparatus of claim 1, wherein the switched mode cycloconverter is a single-phase cycloconverter.

6. The apparatus of claim 1, wherein the switched mode cycloconverter is a three-phase cycloconverter.

7. A method of controlling reactive power comprising:
determining a desired amount of a reactive power component to be generated; and
generating AC power, using a resonant power converter comprising a switched mode cycloconverter, having the desired amount of the reactive power component, wherein the desired amount of the reactive power component is determined based on a reactive power control schedule,
wherein the switched mode cycloconverter is operable in an AC to DC mode for generating reactive power stored in a storage device of the resonant power converter and operable in a DC to AC mode for creating AC power from DC power, receiving a high-frequency AC signal created by the storage device, and generating the AC power having the desired amount of the reactive power component.

8. The method of claim 7, further comprising receiving the reactive power control schedule.

9. The method of claim 8, wherein the reactive power control schedule comprises a list of reactive power amounts and a corresponding time of day for generating each reactive power amount of the list of reactive power amounts.

10. The method of claim 8, wherein the reactive power control schedule comprises a schedule of reactive power to be generated as a function of one or more of AC grid voltage, bidirectional power converter output power, change in AC grid voltage, or a fixed value.

11. The method of claim 7, wherein the cycloconverter is part of a bidirectional power converter, and wherein the bidirectional power converter is a static VAr compensator.

12. The method of claim 7, wherein the switched mode cycloconverter is a single-phase cycloconverter.

13. The method of claim 7, wherein the switched mode cycloconverter is a three-phase cycloconverter.

14. A system for controlling reactive power, comprising:
a DC source for generating DC power; and
a bidirectional power converter, coupled to the DC source for receiving the DC power, comprising a switched mode cycloconverter operable in a AC to DC mode for generating reactive power stored in an storage device of the bidirectional power converter and operable in a DC to AC mode for creating AC power from DC power, receiving a high-frequency AC signal created by the storage device, and generating AC power having a desired amount of a reactive power component, wherein the bidirectional power converter is a resonant converter and generates the desired amount of the reactive power component as determined by a reactive power control schedule.

15. The system of claim 14, wherein the reactive power control schedule comprises a list of reactive power amounts and a corresponding time of day for generating each reactive power amount of the list of reactive power amounts.

16. The system of claim 14, wherein the reactive power control schedule comprises a schedule of reactive power to be generated as a function of one or more of AC grid voltage, bidirectional power converter output power, change in AC grid voltage, or a fixed value.

17. The system of claim 14, wherein the switched mode cycloconverter is a single-phase cycloconverter.

18. The system of claim 14, wherein the switched mode cycloconverter is a three-phase cycloconverter.

* * * * *